United States Patent [19]
Cox et al.

[11] Patent Number: 5,644,651
[45] Date of Patent: Jul. 1, 1997

[54] METHOD FOR THE ESTIMATION OF ROTATION BETWEEN TWO FRAMES VIA EPIPOLAR SEARCH FOR USE IN A THREE-DIMENSIONAL REPRESENTATION

[75] Inventors: Ingemar J. Cox, Lawrenceville; Sebastien Roy, Princeton, both of N.J.

[73] Assignee: NEC Research Institute, Inc., Princeton, N.J.

[21] Appl. No.: 414,397

[22] Filed: Mar. 31, 1995

[51] Int. Cl.$^6$ .............. G06K 9/00; G06K 9/36; G06F 15/00
[52] U.S. Cl. .......... 382/154; 382/285; 382/295; 382/296; 395/119; 395/137; 395/138; 348/48
[58] Field of Search .................. 382/154, 153, 382/285, 295–297, 168, 289; 395/119, 125, 127, 137, 138; 345/139; 356/12; 348/42, 48, 50, 578, 580, 583

[56] References Cited

U.S. PATENT DOCUMENTS

| | | | |
|---|---|---|---|
| 5,475,422 | 12/1995 | Mori et al. | 348/48 |
| 5,533,177 | 7/1996 | Wirtz et al. | 395/119 |
| 5,581,665 | 12/1996 | Sugiura et al. | 395/119 |

OTHER PUBLICATIONS

B.K.P. Horn et al "Direct Methods for Recovering Motion" in International Journal of Computer Vision, vol. 2, pp. 51–76 (1988).

Ingemar J. Cox, "A Maximum Likelihood N–Camera Stereo Algorithm" in IEEE Conference on Computer Vision and Pattern Recognition, Jun. 21–23, 1994, pp. 733–739.

R.C. Gonzalez and R.E. Woods, "Digital Image Processing," (New York: Addison–Wesley, 1993), pp. 171–185.

O. Faugeras, "Three–Dimensional Computer Vision: A Geometric Viewpoint" (Cambridge, MA: The MIT Press, 1993), chapter 6.

R. Kumar et al, "Shape recovery from multiple views: a parallax based approach" in Proc. of ARPA Image Understanding Workshop, 1994.

R.C. Bolles et al, "Epipolar–Plane Image Analysis: A Technique for Analyzing Motion Sequences" in Proc. of IEEE 3rd Workshop on Computer Vision: Representation & Control (1985), pp. 168–178.

*Primary Examiner*—Leo Boudreau
*Assistant Examiner*—Bhavesh Mehta
*Attorney, Agent, or Firm*—Arthur J. Torsiglieri

[57] ABSTRACT

A technique for compensating for egomotion of the camera used to record a pair of two-dimensional views of a scene when the pair of images is to be used to provide a three dimensional representation of the scene. The technique involves comparing histograms of the intensity levels of pixels of corresponding epipolar lines in the pair of images for assumed amounts of egomotion to identify the amount that results in the smallest total of the sums of squared differences of the histograms.

9 Claims, 3 Drawing Sheets

METHOD FOR THE ESTIMATION OF ROTATION BETWEEN TWO FRAMES VIA EPIPOLAR SEARCH FOR USE IN A THREE-DIMENSIONAL REPRESENTATION

FIELD OF THE INVENTION

This invention relates to computer vision and more particularly to use of a computer to develop a three-dimensional representation of a scene from two-dimensional representations of the scenes and other uses that depend on knowledge of changes in orientation of different views of an object.

BACKGROUND OF THE INVENTION

In computer vision systems that seek to reconstruct a three-dimensional representation of a scene or object from two-dimensional images of the scene or object, important parameters are the changes in viewpoints of the different views of the scene. When two images of the scene represent two views that involve unknown rotation and translation of the camera recording the scene, to be termed egomotion, such as might result from noise, considerable computation is involved in making a faithful three-dimensional reconstruction. A faithful three-dimensional reconstruction has utility in many applications, such as estimation of travel in navigation, three-dimensional representation of an object from two two-dimensional representations and video mosaicing, the integration of many views of different parts of a scene into a single view of the total scene, such as is described in an article by R. Kumar et al entitled, "Shape recovery from multiple views: a parallax based approach," in the Proc. of ARAP Image Understanding Workshop, 1994.

The problem of estimating the ego-motion and structural form from two image frames of a scene has long been studied in computer vision. There have been primarily two distinct classes of structure-and-motion algorithms that have been tried. The first is feature-based and assumes that there is a known number of feature-correspondence between the two frames. While few correspondences are needed in theory to solve the structure-and-motion problem, this approach is very sensitive to noise and many correspondences are in fact needed to stabilize the solution. Moreover, it is often the case that no feature-correspondences are known a priori and finding these can be laborious.

The second approach involves a class of direct methods of motion-and-structure estimating in which explicit feature-correspondences are not required.

Solutions using this approach can be broadly categorized into two main subclasses. One subclass approach to the problem is first to develop knowledge of the optical flow field of the frames involved. The second subclass approach has been to exploit the brightness-change constraint equation directly to develop solutions for motion and structure, as is described in an article by B. K. P. Horne and E. J. Weldon, Jr. entitled, "Direct Methods for Recovering Motion," in Int. J. of Computer Vision, vol. 2, 1988, pages 51–76.

SUMMARY OF THE INVENTION

The present invention involves a direct method for estimating the rotational egomotion between a pair of two-dimensional images or camera frames of a scene that is based on a search through the three-dimensional rotational space that is associated with the scene. This is possible if, and only if, there exists image properties such that each hypothesized ego-motion can be evaluated relative to one another so that a particular ego-motion can be identified as the most appropriate one for use in the three-dimensional representation.

A feature of the invention is the novel use of the properties of intensity histograms computed along epipolar lines that can be supposed to be corresponding. These useful properties first depend on the assumption of constant image brightness so that one can assume that the histograms of corresponding epipolar lines are invariant (ignoring occlusions) and that the histograms of almost corresponding epipolar lines are similar, this similarity being a function of the spatial correlation present in the image. There are available techniques such as histogram normalization that can be used to compensate for variations in image brightness and thereby satisfy the assumption.

The property that the difference between two histograms of two epipolar lines is a minimum when the two epipolar lines truly correspond and increases monotonically with the degree of misalignment between two epipolar lines allows the rotational motion between the two to be estimated in a straightforward manner as a three-dimensional epipolar search.

Accordingly, the amount of rotation between two camera frames of the same scene taken from two viewpoints that are spaced apart can be effectively estimated as follows. First, there is assumed that a certain amount of pure rotation was involved in the difference in viewpoints and based on such assumption there are derived epipolar lines for the two frames by known methods. For each frame, histograms of the pixel intensities along a number of corresponding epipolar lines are derived. There is then derived the sum of squared-differences between the histograms of corresponding epipolar lines from the two frames for each of the chosen number of epipolar lines of the two frames and this serves as a figure of merit for the particular assumption of the amount of the rotation. This process is repeated with different assumed amounts of rotation and a suitable search, for example gradient descent or pyramidal, is carried out to find the assumed rotation that gives the lowest value of the figure of merit. The amount of rotation of such assumption is then treated as the actual amount of the rotation in the further processing of the frames to derive three-dimensional representations of the scene involved or other uses. In instances where the separation or translation of the two viewpoints may be significant, it may be desirable to approximate the amount of such separation or translation by repeating above the procedure or other suitable procedure using instead assumptions as to the separation either after or before the above procedure for determining the amount of rotation. In some instances, it may be preferable first to estimate the translation and thereafter to estimate the rotation of the ego-motion.

The invention will be better understood from the following more detailed description taken with the accompanying drawing.

DETAILED DESCRIPTION OF THE INVENTION

Figure 1:
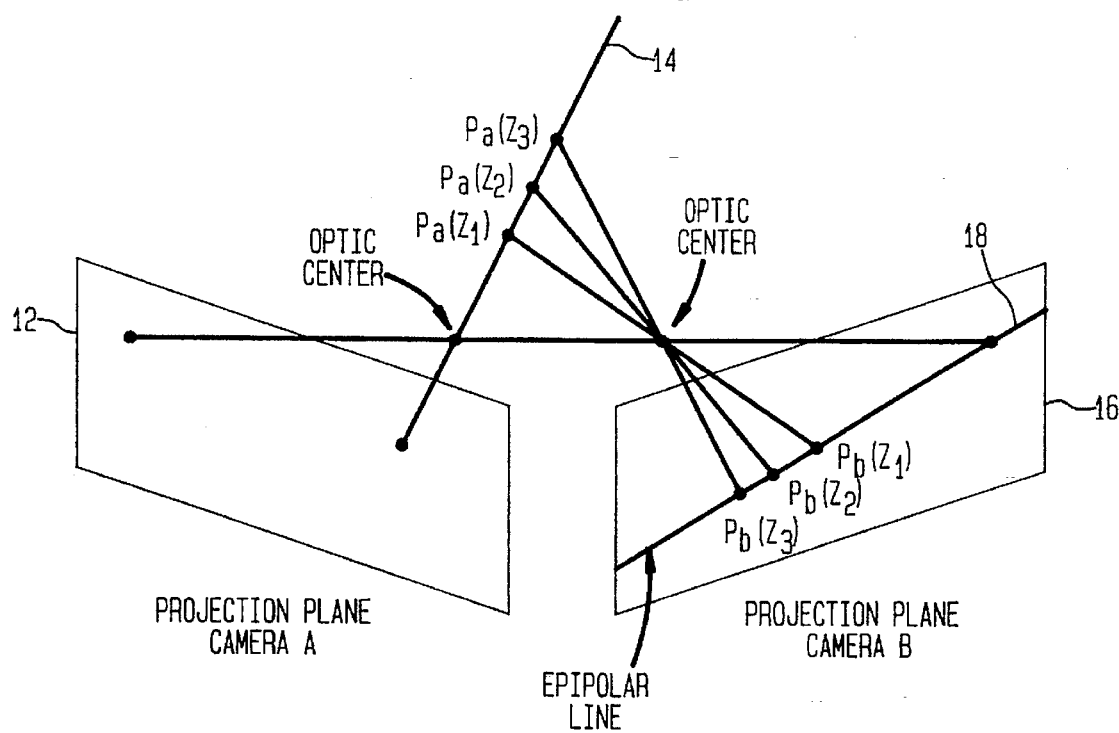
FIG. 1 will be helpful in a preliminary discussion of epipolar geometry.

Before discussing in detail the practice of the invention, it will be helpful to provide some background in epipolar geometry with the aid of FIG. 1. To this end we begin with a brief review of some simple mathematics to describe the epipolar relationship between two slightly different views of a scene. With perspective projection, a projected point $P_a'=[x'_a y'_a 1]^T$ in projection plane 12 of camera A (not shown) can be the projection of a line 14 of three-dimensional points $P_a(z_a)$ of different depth $z_a$. We then have $$P_a(z_a) = \begin{bmatrix} x'_a z_a/f \\ y'_a z_a/f \\ z_a \\ 1 \end{bmatrix}$$

where f is the focal length. Projecting those points to the projection plane 16 of camera B (not shown) gives a set of collinear points $P_b'(z_a)=[x'_b y'_b 1]^T$ that will form the epipolar line 18.

We also have $$P_b^*(z_a) = J \cdot P_b(z_a) = J \cdot T_{ab} \cdot P_a(z_a) = \begin{bmatrix} f(z_a A + t_{14}) \\ f(z_a B + t_{24}) \\ z_a C + t_{34} \end{bmatrix}$$

where $T_{ab}$ represents the coordinate transformation between the two cameras and $$\begin{bmatrix} A \\ B \\ C \end{bmatrix} = \begin{bmatrix} t_{11} & t_{12} & t_{13} \\ t_{21} & t_{22} & t_{23} \\ t_{31} & t_{32} & t_{33} \end{bmatrix} \cdot \begin{bmatrix} x'_a/f \\ y'_a/f \\ 1 \end{bmatrix}$$

and $t_{ij}$ is element (i, j) of matrix $T_{ab}$. The projection matrix J is defined as $$J = \begin{bmatrix} f & 0 & 0 & 0 \\ 0 & f & 0 & 0 \\ 0 & 0 & 1 & 0 \end{bmatrix}$$

and P* is the projective coordinate representation of a point P. If $P^*=[uvw]^{*T}$, then the homogeneous euclidean coordinate P' is $[u/w v/w 1]^T$.

The displacement of the image point $P_a'$ can be decomposed into two components. The first component is the rotational part of the displacement and is defined as $$\vec{M}_{P_a} = \lim_{z_a \to \infty} P_a = \begin{bmatrix} fA/C - x'_a \\ fB/C - y'_a \\ 1 \end{bmatrix} \quad (1)$$

while the second component is the epipolar vector, or translational part of the displacement, and is defined as $$\vec{E}_{P_a} = P'_b(z_{min}) - \lim_{z_a \to \infty} P'_b(z_a) = \begin{bmatrix} f(t_{14}C - t_{34}A)/C(t_{34} + Cz_{min}) \\ f(t_{24}C - t_{34}B)/C(t_{34} + Cz_{min}) \end{bmatrix} \quad (2)$$

where $z_{min}$ is the minimum depth expected for $P_a$. Those components can be used to derive the simple relation $$P_b' = P_a' + \vec{M}_{P_a} + e\vec{E}_{P_a}, \quad 0 \le e \le 1 \quad (3)$$

where e is the disparity along the epipolar vector. Equations (1) and (2) indicate that the rotational displacement is independent of distance while the translational displacement shifts points along the epipolar line by amounts that are inversely proportional to distance, as illustrated in FIG. 2.

A more detailed discussion of epipolar geometry is provided by a paper entitled "Epipolar-Plane Image Analysis: A Technique for Analyzing Motion Sequences" by R. C. Bolles and H. H. Baker that appeared in PROC. IEEE 3rd Workshop on Computer Vision Representation and Control, pp. 168–178, (1985) and such paper is incorporated herein by reference. With this background, we can lay a theoretical basis for the invention.

Consistent with the earlier mentioned first property of histograms, if we assume (1) that the constant brightness constraint applies, i.e. the brightness of an imaged point is unchanged by the motion of the camera, and (2) that the number of occlusions is small, then it is clearly the case that the histograms of the intensities of two corresponding epipolar lines are identical since the two lines contain essentially identical pixel intensities, only their position may be changed because of depth.

Figure 2:
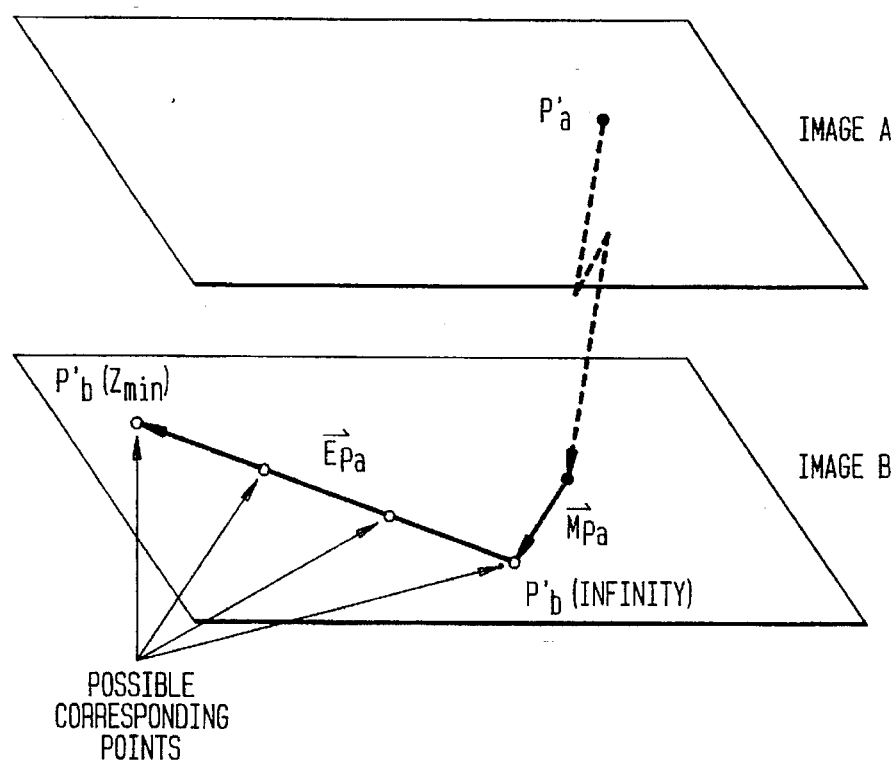
FIG. 2 illustrates rotational and translational components of the displacement in an epipolar line resulting from some camera motion.

Now we consider the case in which the camera motion contains a small change, either in its rotational or translational component, as represented in FIG. 2. As a consequence, the "epipolar" lines of Equation (3) above will be erroneous, but close to the true epipolar lines.

This now prepares us for use of the second property of histograms mentioned earlier. Assuming (1) that the constant brightness constraint applies, and (2) that the number of occlusions is small, then the intensity histograms of two "pseudo-epipolar" lines that are spatially close to a pair of truly corresponding epipolar lines have similar (in a sum of squared errors sense) histograms. The difference between two pseudo-epipolar histograms is a minimum when the lines correspond to the true epipolar geometry and increases approximately monotonically with the size of the rotational error.

Figure 3A:
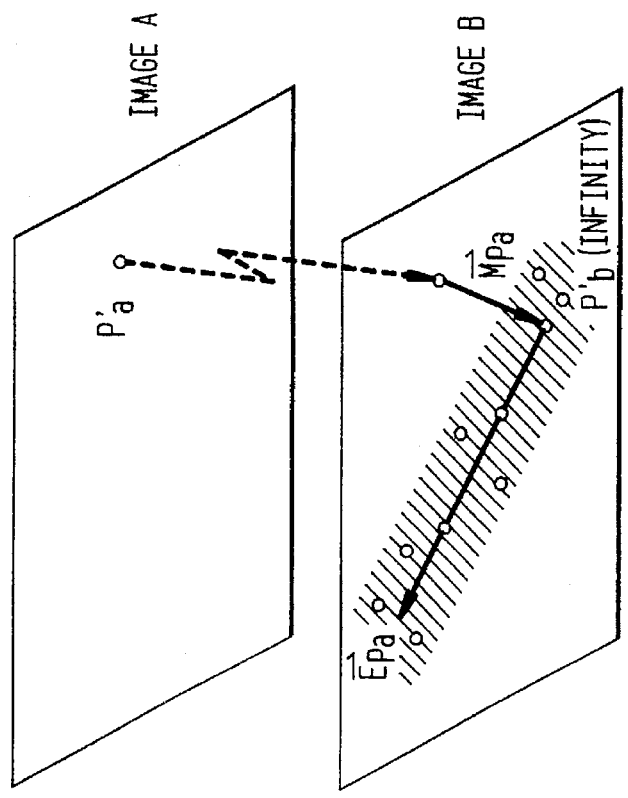
FIGS. 3A & 3B illustrate errors in epipolar lines for inaccurate translation and inaccurate rotation, respectively.
Figure 3B:
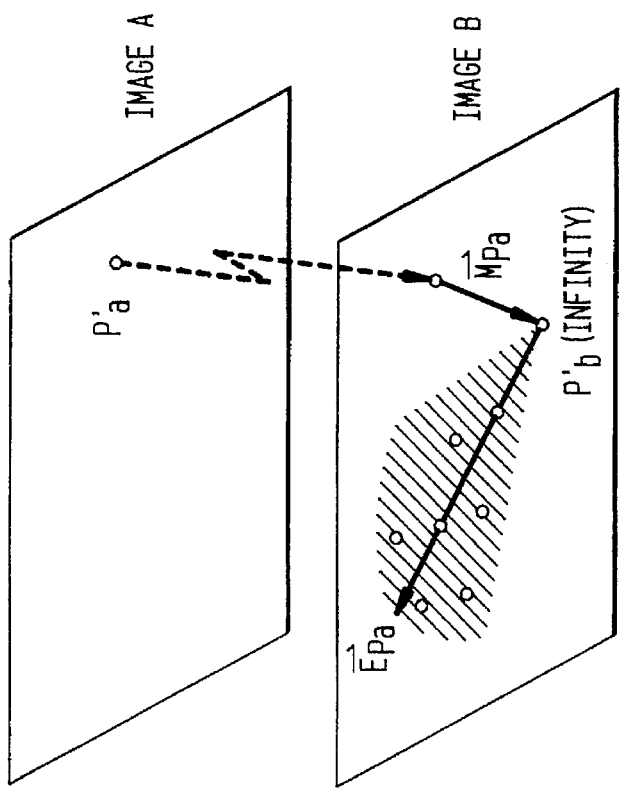

That this property applies generally to natural images can be deduced as follows. It is well known that image intensities are spatially highly correlated. As depicted in FIG. 3, small errors in the camera displacement $T_{ab}$ cause a point $P_a'$ in image A to be projected to a point which is spatially close to the true epipolar line $\vec{E}_{P_a}$. The smaller the error, the closer this point is to $\vec{E}_{P_a}$. Local image coherence then insures that the intensity value of an erroneous correspondence is close to the true intensity value that lies somewhere on the true epipolar line.

While it is easy to construct artificial images for which the second property does not hold, these images are never natural, For example, an image of a rotationally invariant circle would not allow the z component of rotation to be estimated, However, in general, we believe this property to hold for a large class of images, By comparing the effects of translational error and rotational error, (FIG. 3A and FIG. 3B, respectively), it can be shown that translational error usually creates less displacement from the true epipolar line than rotational error. This is due to the fact that the displacement magnitude from translational error is "inversely scaled" by the minimum depth of the objects in the scene, while the displacement from rotational error is not (see Equations (1) and (2)).

This implies that if the objects are not too close, the rotational error always has a much bigger impact than translational error. In the limit case where all objects are in the background (at infinity), the translation error does not create any displacement at all.

One can derive an important conclusion from this relation. The translational error generally creates a "negligible"

amount of displacement from the true epipolar line. Thus one can assume in the usual case that rotational error causes all point displacement. There will be discussed later a suitable approach for the unusual case.

With this theoretical basis as a background, we can now proceed to a description of the process of the invention.

Figure 4:
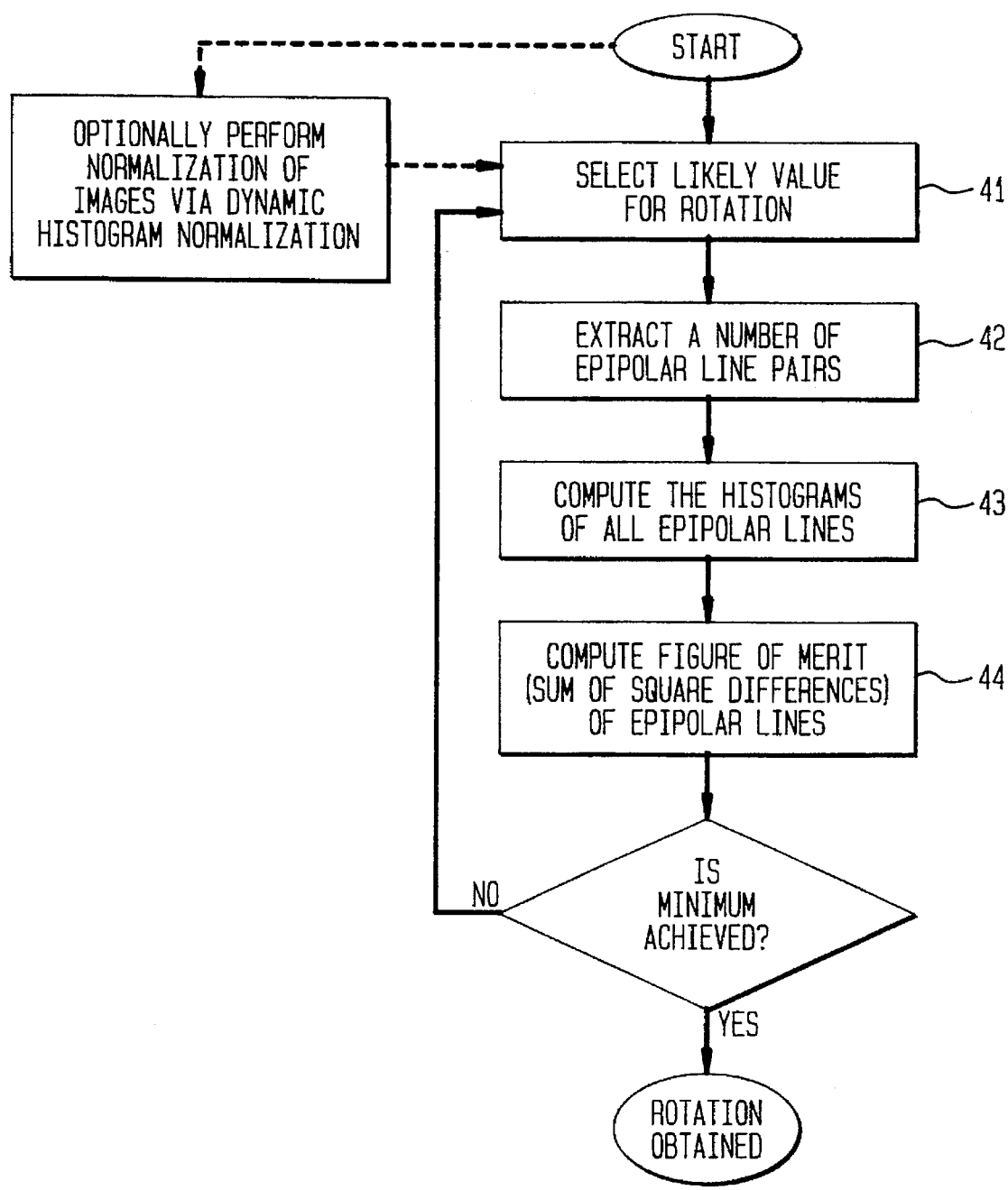
FIG. 4 is a flow diagram of the basic procedure used in the invention.

FIG. 4 is a flow chart of the process for determining the unknown amount of rotation between two frames of a scene taken either by two cameras that are spaced apart or one camera that has been moved to record the two frames. For this process, constant image brightness, which is the more typical case, is being assumed. As depicted in the flow chart, the first step 41 is to assume a likely value for the rotation and on this basis derive corresponding epipolar lines of the two frames. One would derive a number of such lines, typically at least one quarter of the lines in the frame and preferably about as many lines as were used in the frame, the accuracy generally improving the greater the number, because of the reduced sensitivity to noise this achieves. Then, as a second step 42, there are prepared histograms of the pixel intensities along the selected pairs of corresponding epipolar lines of the two frames. Then, as a next step 43, for each of the pairs of corresponding epipolar lines, in turn there is separately derived from the histograms of such pairs of lines the sum of squared differences. Then, as step 44 the total of these sums of squared differences for all of the pairs is determined for use as a figure of merit of the assumed amount of rotation. The process is then repeated to derive a figure of merit for a different assumed amount of rotation. If the second figure of merit is smaller than the first, the process is repeated with a still larger assumed amount of rotation. If the second figure of merit was larger than the first, the process is repeated with an assumed amount smaller than the original amount. In similar fashion in a gradient-descent search, the process is repeated until one finds the rotation that yields the minimum or near minimum of the figure of merit. The amount of rotation that yielded such minimum is essentially the true amount of the rotation. Once the amount of rotation is known, this can be used in known fashion in conjunction with the two frames of the scene to construct a quite accurate three dimensional representation of the scene.

Alternatively, a pyramidal search can be used in which one begins with a coarse search to find an approximate value and to follow it up with finer and finer searches centered about the narrowed region delimited by the previous search.

In order to ensure that the images satisfy the constant image brightness assumption, the two images can be first normalized by a process of histogram normalization, which is described in an article by I. J. Cox entitled "A Maximum Likelihood N-Camera Stereo Algorithm," published in the proceedings of the Int. Conf. Computer Vision & Pattern Recognition (1994), pages 733-739, or histogram specification, which is described in an article by Gonzalez and Wintz entitled "Digital Image Processing."

It can be appreciated that while FIG. 4 has been described as a flow chart of the process practiced by the invention, it can also serve as a block diagram of hardware components of apparatus designed to carry out the steps that are set forth. In particular, each of the blocks could be a special purpose computer designed to carry out the operating step prescribed for it.

As was previously mentioned in the above procedure, there has been assumed that any translational motion of the camera in the two views could be ignored as having a negligible effect on determining the rotational motion. In some instances, one may begin by assuming that the motion is entirely of one type, for example rotational, and proceed in the manner discussed to derive an approximation of such rotational motion. This could then be followed by use of the same general approach, using the rotational approximation found as the fixed value of such motion, to get an approximation of the translational motion. There are available techniques for estimating the translational motion once there is known the rotational motion. In instances when especially high accuracy is desired, there can now be derived a new approximation of the rotational motion, using the last discovered approximation of the translational motion to derive an improved approximation of the rotational motion. In this fashion by successive approximations, a very high degree of accuracy should be obtainable.

The construction of a three dimensional representation of an object from a pair of two-dimensional representations of the object is described in Chapter 6, Stereo Vision, pps. 165-240 of a book entitled "Three-Dimensional Computer Vision" by Oliver Faugeras published by the MIT Press, Cambridge Mass. (1993).

It should be understood that the specific embodiments described are illustrative of the general principles of the invention. In particular it should be appreciated that there are other applications where it is important to know the amount of rotation or translation of a camera is involved between different frames of an object or scene. For example, there are navigational applications in which a camera mounted in a robot or on a vehicle takes successive frames of a scene as the robot or vehicle moves past a scene to determine its position and knowledge of the rotation or translation of the camera is important to such determination.

What is claimed is:

1. In a process for the three dimensional representation of a scene from a plurality of two-dimensional images of the scene that depends on knowing the amount of rotation involved in the viewpoints represented by a pair of different images of the scene, the method for approximating the amount of rotation involved comprising the steps of:

(a) determining a plurality of corresponding pairs of epipolar lines in a pair of images of the scene assuming a specific amount of rotation between the two viewpoints of the pair of images;

(b) preparing a histogram of the pixel intensities along each of the epipolar lines;

(c) determining the sum of the squared differences of the pixel intensity levels of the histograms of each pair of corresponding epipolar lines of the two images;

(d) determining the total of such sums;

(e) repeating steps a, b, c and d for different amounts of assumed rotation; and (f) using the amount of assumed rotation that is associated with the smallest total determined in step d.

2. The method of claim 1 in which the plurality of pairs of epipolar lines in step a is at least fifty.

3. The method of claim i in which step a uses a gradient descent search in the choice of the amount of the assumed rotation.

4. The method of claim 1 in which histogram normalization is first used to compensate for variations in image brightness.

5. In a process for the three dimensional representation of a scene from a plurality of two-dimensional images of the scene that depends on knowing the amount of translation involved in the viewpoints represented by a pair of different images of the scene, the method for approximating the amount of translation involved comprising the steps of:

(a) determining a plurality of corresponding pairs of epipolar lines in a pair of images of the scene assuming a specific amount of translation between the two viewpoints of the pair of images;

(b) preparing a histogram of the pixel intensities along each of the epipolar lines;

(c) determining the sum of the squared differences of the pixel intensity levels of the histograms of each pair of corresponding epipolar lines of the two images;

(d) determining the total of such sums;

(e) repeating steps a, b, c and d for different amounts of assumed translation; and (f) using the amount of translation assumed that is associated with the smallest total determined in step d.

6. The method of claim 5 in which the plurality of pairs of epipolar lines in step a is at least fifty.

7. The method of claim 5 in which step a uses a gradient descent search in the choice of the amount of the assumed translation.

8. The method of claim 5 in which histogram normalization is first used to compensate for variations in image brightness.

9. In a process for determining the egomotion of the viewpoint of a camera in two frames of an image, the process of claim 1 for determining the rotational component of the egomotion and the process of claim 5 for determining the translational component of the egomotion.

* * * * *